(12) United States Patent
Freire

(10) Patent No.: US 11,165,379 B2
(45) Date of Patent: Nov. 2, 2021

(54) MONITORING A MULTI-WINDING SET STATOR

(71) Applicant: Siemens Gamesa Renewable Energy A/S, Brande (DK)

(72) Inventor: Nuno Miguel Amaral Freire, Brande (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/641,008

(22) PCT Filed: May 17, 2018

(86) PCT No.: PCT/EP2018/062857
§ 371 (c)(1),
(2) Date: Feb. 21, 2020

(87) PCT Pub. No.: WO2019/037908
PCT Pub. Date: Feb. 28, 2019

(65) Prior Publication Data
US 2021/0028731 A1  Jan. 28, 2021

(30) Foreign Application Priority Data

Aug. 22, 2017 (DE) .......................... 102017214670.2

(51) Int. Cl.
*H02P 9/44* (2006.01)
*H02P 9/00* (2006.01)
(Continued)

(52) U.S. Cl.
CPC ............... *H02P 9/44* (2013.01); *H02P 9/006* (2013.01); *H02P 9/02* (2013.01); *H02P 2101/15* (2015.01)

(58) Field of Classification Search
CPC ............... H02P 9/44; H02P 9/006; H02P 9/02
See application file for complete search history.

(56) References Cited

U.S. PATENT DOCUMENTS

2008/0042683 A1  2/2008  Kasztenny et al.
2015/0276823 A1  10/2015  Rodriguez et al.
(Continued)

FOREIGN PATENT DOCUMENTS

EP  2672624 A1  12/2013
EP  2919026 A1  9/2015
(Continued)

OTHER PUBLICATIONS

Briz, Fernando, et al., "Stator Windings Fault Diagnostics of Induction Machines Operated From Inverters and Soft-Starters Using High-Frequency Negative-Sequence Currents", IEEE Transactions on Industry Applications, vol. 45, No. 5, pp. 1637-1646, Sep./Oct. 2009; 10 pages.
(Continued)

*Primary Examiner* — Sean Gugger
(74) *Attorney, Agent, or Firm* — Schmeiser, Olsen & Watts LLP

(57) ABSTRACT

A method of monitoring a first winding set and at least one second winding set of a stator of a generator during operation is provided. The method includes: obtaining a first strength of a second harmonic of a first power produced from the first winding set; obtaining a second strength of a second harmonic of a second power produced from the second winding set; diagnosing the first winding set and/or the second winding set based on a second harmonic power difference between the first strength and the second strength.

15 Claims, 3 Drawing Sheets

(51) Int. Cl.
*H02P 9/02* (2006.01)
*H02P 101/15* (2016.01)

(56) References Cited

U.S. PATENT DOCUMENTS

2017/0179864 A1* 6/2017 Seguchi ............... H02K 1/26
2018/0131304 A1* 5/2018 Gieras ............... H02K 1/165
2019/0137568 A1* 5/2019 Freire ............... G01R 31/346

FOREIGN PATENT DOCUMENTS

EP 2958228 A1 12/2015
EP 3306330 A1 4/2018

OTHER PUBLICATIONS

Yun, Jangho, et al., "Detection and Classification of Stator Turn Faults and High Resistance Electrical Connections for Induction Machines", IEEE Transactions on Industry Applications, pp. 1923-1931, 2009; 9 pages.

Yun, Jangho, et al., "Online Detection of High-Resistance Connections in the Incoming Electrical Circuit for Induction Motors", IEEE Transactions on Industry Applications, vol. 45, No. 2, pp. 694-702, Mar./Apr. 2009; 9 pages.

Mengoni, Michele, et al., "Online Detection of High-Resistance Connections in Multiphase Induction Machines", IEEE Transactions on Power Electronics, vol. 30, No. 8, pp. 4505-4513, Aug. 2015; 9 pages.

De la Barrera, Pablo M., et al.; "High-Resistance Connection Detection in Induction Motor Drives Using Signal Injection", IEEE Transactions on Industrial Electronics, vol. 61, No. 7, pp. 3563-3573, Jul. 2014; 11 pages.

Drif, M'hamed, et al., "Stator Fault Diagnostics in Squirrel Cage Three-Phase Induction Motor Drives Using the Instantaneous Active and Reactive Power Signature Analyses", IEEE Transactions on Industrial Informatics, vol. 10, No. 2, pp. 1348-1360, May 2014; 13 pages.

Mengoni, Michele, et al., "Online Detection of High-Resistance Connections With Negative-Sequence Regulators in Three-Phase Induction Motor Drives", IEEE Transactions on Industry Applications, vol. 51, No. 2, pp. 1579-1586, Mar./Apr. 2015; 8 pages.

Zarri, Luca, et al., "Detection and Localization of Stator Resistance Dissymmetry Based on Multiple Reference Frame Controllers in Multiphase Induction Motor Drives" IEEE Transactions on Industrial Electronics, vol. 60, No. 8, pp. 3506-3518, Aug. 2013; 13 pages.

International Search Report and the Written Opinion of the International Searching Authority in PCT Application No. PCT/EP2018/062857, dated Aug. 31, 2018. 12 pages.

* cited by examiner

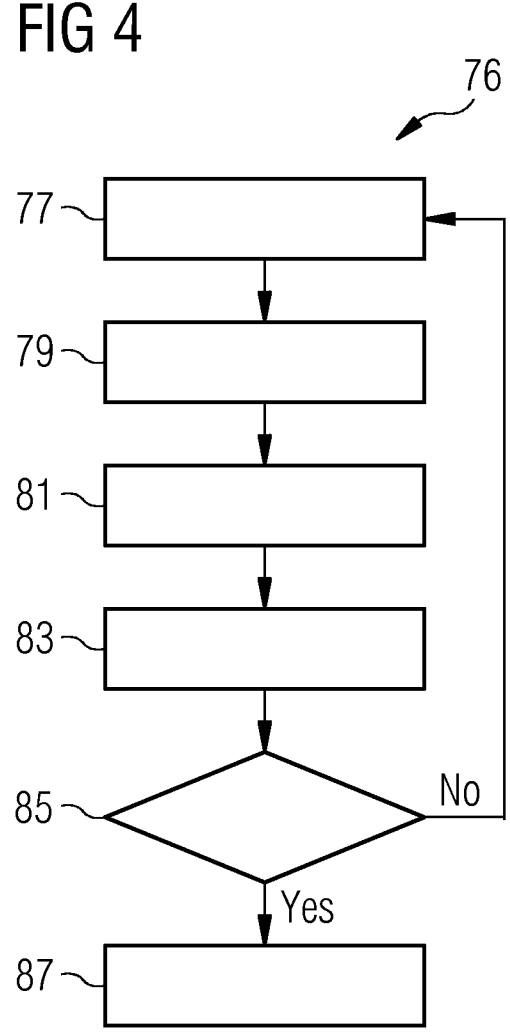

MONITORING A MULTI-WINDING SET STATOR

CROSS-REFERENCE TO RELATED APPLICATIONS

This application claims priority to PCT Application No. PCT/EP2018/062857, having a filing date of May 17, 2018, based on DE 102017214670.2, having a filing date of Aug. 22, 2017, the entire contents of both are hereby incorporated by reference.

FIELD OF TECHNOLOGY

The following relates to a method and to an arrangement of monitoring a first winding set and at least one second winding set of a stator of a generator during operation. Further, the following relates to a generator comprising the arrangement and further relates to a wind turbine comprising the generator.

BACKGROUND

A multi-stator electrical machine comprises a stator having two or more sets of windings. One or more of the winding sets may be faulty due to several reasons. For example, high resistance connections usually may result from loose connections (due to poor workmanship, thermal cycling and vibrations or damage of the contact surfaces due to pitting, corrosion or contamination) which may evolve to open-circuit faults. Furthermore, secondary damages may be expected as a consequence of overheating and excessive vibrations, some examples are insulation damages, melting of copper conductors, short-circuit faults and fire. Therefore, taking into account the high economic impact of such fault scenarios, ultimately leading to generator replacement, it is of vital importance to incorporate reliable diagnostic methods into the converter/turbine controller to protect a wind turbine and in general a generator. Ideally, a diagnostic method should be able to detect a fault at an early stage without generating false alarms.

Some of conventionally used techniques to detect high resistance connections in a stator of a generator may be based on: visual inspections with the aid of infrared thermography; standstill/offline tests (for example resistance measurements); analysis of negative sequence components in phase currents and/or voltages; zero sequence voltages; and high frequency signal injection. Conventionally, diagnosis of stator asymmetries may focus on the detection of short-circuit turns, showing fault signatures somehow similar to high resistance connections.

Thus, there may be a need for a method and an arrangement for monitoring a first winding set and at least one second winding set of a stator of a generator which enables reliable and online monitoring of the winding sets and which is simple to perform and implement.

SUMMARY

Embodiments of the present invention provide a fault diagnosis method which is configured for online condition monitoring and protection of generator employed in particular in wind turbines. Embodiments of the present invention allow to detect high resistance connections in multi-stator permanent magnet generators, enabling the converter controller to stop operation or apply other measures, for example shutting down the faulty winding set. Embodiments of the present invention may detect high resistance connections or short-circuit turns, converter open-circuit faults, current sensors faults, electrical and magnetic asymmetry and static eccentricity. Thus, the present invention is not restricted of detecting high resistance connections of one or more winding sets of a stator of a generator.

According to an embodiment of the present invention it is provided a method of monitoring a first winding set and at least one second winding set of a stator of a generator during operation, the method comprising: obtaining a first strength of a second harmonic of a first power produced from the first winding set; obtaining a second strength of a second harmonic of a second power produced from the second winding set; diagnosing the first winding set and/or the second winding set based on a second harmonic power difference between the first strength and the second strength.

The method may be implemented in software and/or hardware and may in particular execute during operation of the generator (in particular a wind turbine generator), for example carried out by a wind turbine controller or a wind plant controller. The first winding set and the at least one second winding set may in particular be multiphase winding sets, such as three-phase winding sets. Thereby, each winding set may comprise multiple wires, such as three wires, which are wound around teeth in slots of a stator yoke. Different winding schemes may be applied. The generator may further comprise a rotor rotatably supported relative to the stator, wherein in particular plural permanent magnets are attached at the rotor. Upon rotation of the rotor, voltages are induced in the first winding set and in the at least one second winding set enabling production of electric energy. The method may be performed while the rotor rotates relative to the stator and while the generator produces electric energy.

Depending on a rotational speed of the rotor rotating relative to the stator, the generator may output at the first winding set and the second winding set respective AC power fluxes or power streams. Thereby, the first power and the second power is given by the voltages and currents being carried in the first winding set and the second winding set, respectively. The first power as well as the second power may comprise active power and/or reactive power. According to embodiments of the present invention, only the reactive power component (of the first and the second winding set) is used for diagnosing or only the active power component is used for diagnosing or both, the active power component and the reactive power component are utilized for diagnosing the first winding set and the at least one second winding set.

The second harmonic may be an oscillation (of the output voltage and/or output current of the respective winding set) which oscillates with two times a fundamental electrical frequency of the generator. In the ideal case where no deterioration or fault is present, any of the winding sets is expected to only deliver a power stream of the fundamental electrical frequency such that the second harmonic is essentially zero. In the case that the second harmonic of the respective power is not zero or not smaller than a threshold, it may already indicate that the respective winding set is at least partially faulty.

The first strength of the second harmonic and the second strength of the second harmonic may be obtained or defined as an amplitude of the oscillation having a frequency of two times the fundamental electrical frequency. The second harmonic power difference is the difference between the first strength of the second harmonic of the first power and the second strength of the second harmonic of the second power.

If there is a deviation between the first strength and the second strength it may indicate that one of the winding sets, in particular the one which has the higher strength of the second harmonic, is at least partly faulty, such as exhibiting high resistance connections or loose connections or other deficiencies.

A high resistance connection in at least one phase of an electric machine may cause an additional voltage drop, resulting in asymmetric/unbalanced terminal voltages and/or phase currents. Thus, if a high resistance connection is present in one of the winding sets, the voltage drop for this particular winding set is expected to be higher than for the (healthy or unimpaired) winding set. Despite the fact that most large machines are inherently unbalanced to some degree (which will be taken into account by applying an offset as explained below), the variation between normal and faulty operation may be detected by a suitable condition monitoring method as is proposed in embodiments of the present invention.

Embodiments of the present invention may be utilized for a closed-loop control system (for example vector controlled drives, direct torque control drives, etc.) in which the fault information contained in the electrical quantities may not be confined to phase currents as a consequence of adopted control strategies and controller's bandwidth. Therefore, the use of instantaneous power appears to be attractive, since fault information contained in currents and voltages is combined.

One basic principle of embodiments of the present invention is to monitor the second harmonic in the active and reactive instantaneous powers in all stators (i.e. stator windings) of a multi-stator generator and to exploit the deviations between different stators for diagnostic purposes.

By using information from multiple stators, robustness and sensitivity of the diagnostic method may be improved compared to conventional methods. In particular, robustness against transients, such as speed and power variations, may be improved. Further, false alarms may be avoided which may have been raised in conventional methods due to transients and inherent asymmetries.

In particular, also a faulty detection may be enabled under low load conditions and low severity faults according to embodiments of the present invention. Thus, a reliable and robust diagnosing method may be provided.

According to an embodiment of the present invention, the method further comprises obtaining a first power time average of the first power; obtaining a second power time average of the second power; wherein the diagnosing involves forming a power difference ratio proportional to a ratio between the second harmonic power difference and a sum, in particular an average, of the first power time average and the second power time average.

The first power time average and also the second power time average may be obtained by averaging over a particular time interval, in particular moving time interval. The respective power time average may be proportional to an amplitude of an oscillating power flux or power stream. The second harmonic power difference may be divided by the sum of the first power time average and the second power time average to obtain the power difference ratio. When this ratio is formed, the difference is normalized to the average in power output of the two winding sets, thereby appropriately relating the second harmonic power difference to the relevant power order. When the ratio is considered for further analysis, a threshold may not be required to be load dependent but could be set as fixed value. In other embodiments, the second harmonic power difference is considered without forming the ratio but respective thresholds may then be set to be load or power dependent. Forming the power difference ratio may further simplify the method and may in particular simplify setting the thresholds.

According to an embodiment of the present invention, diagnosing involves comparing a term derived from the power difference ratio with a difference threshold, wherein one of the first or the second winding set is diagnosed as faulty, if the absolute of the term is larger than the difference threshold.

When the absolute of the term is large, the difference between the first strength and the second strength is large, indicating that one of the winding sets is faulty. The term may be obtained as a value shifted by an offset from the power difference ratio. By considering the term instead of the power difference ratio as such, inherent (power output) differences between the first winding set and the second winding set may be taken into account. Thereby, for example false alarms may be avoided or at least reduced. The difference threshold may be set such that under normal conditions (i.e. healthy or not faulty winding sets), the absolute of the term is smaller than the difference threshold. The difference threshold may for example be set by analyzing not deteriorated or not faulty winding sets during operation. When the term is compared to the difference threshold, a simple diagnosing method may be carried out.

According to an embodiment of the present invention, the term is formed as the power difference ratio diminished by an offset being related to an expected difference of power output between the first winding set and the second winding set, both in a normal state.

From the power difference ratio, the offset may be subtracted to obtain the term. The offset may account for the inherent asymmetry of power output or inherent difference in configuration or constitution of the first winding set and the second winding set. By applying the offset, false alarms may be avoided or at least reduced. The offset may be determined from operational parameters, such as voltages, currents under normal, healthy conditions or measured in a healthy state. The offset can e.g. be either a constant or variable. In the second case, the offset may be defined as a function of the fundamental power. For instance, the expected offset may simply be given by a linear function:

Expected_offset=Expected_$m$*Pdc+Expected_$b$, wherein Pdc is the DC power value, Expected_m and Expected_b are fitting parameters or predetermined constants.

More complex relationships may be considered, but the results provided show that a good approximation can be obtained by means of a linear function.

According to an embodiment of the present invention, the second harmonic relates to two times a fundamental electrical frequency that is proportional to a rotational speed of a rotor rotating relative to the stator. The fundamental electrical frequency may be calculated as a product of the rotational speed of the rotor and number of poles pairs of permanent magnets.

The fundamental electrical frequency f in Hz may be given by:

$f=n*p/60$ where n is rotor speed in rpm and p is the number of pole pairs.

Under normal operating conditions, the second harmonic (of voltage, current and/or power) should essentially be zero.

According to an embodiment of the present invention, the method further comprises forming a first power ratio being proportional to a ratio between the first strength and the first power time average; comparing the first power ratio with a first threshold; forming a second power ratio being proportional to a ratio between the second strength and the second power time average; comparing the second power ratio with a second threshold; diagnosing the first winding set and the second winding set as faulty, if: the first power ratio is larger than the first threshold and the second power ratio is larger than the second threshold and the absolute of the term is smaller than the difference threshold.

The present embodiments allow to detect the situation, where both, the first winding set and also the second winding set is faulty. In this case, the power difference ratio may be relatively small or even close to zero in the case where both winding sets exhibit a similar fault. In this case, however, it may also be detected that both winding sets are faulty, if the respective power ratio is larger than the respective threshold. Thereby, again, the first power ratio may be calculated as forming the ratio between the first strength and the first power time average to form an appropriate normalization of the first strength. This may have the advantage that the first threshold (which may in particular be the same as the second threshold) may be set as fixed value. Thereby, embodiments of the present invention allow to detect that only one of the winding sets is faulty and also allow to detect that both of the winding sets or all of the winding sets of a multi-stator machine are faulty.

According to an embodiment of the present invention, the first power and/or the second power includes active power and/or reactive power, wherein for active power and/or reactive power respective strengths of the second harmonic of the power and/or respective second harmonic power differences and/or respective power time averages and/or respective power difference ratios are obtained and used, individually or in combination, for the diagnosing.

Embodiments of the present invention allow to exclusively consider the active powers or exclusively consider the reactive powers or consider a combination of reactive powers and active powers for diagnosing the winding sets. Any of the above-mentioned logical operations disclosed as applied on the "power" may be applied to the active power exclusively, to the reactive power exclusively or to both the reactive power and the active power. For each, the active power and the reactive power considerations, appropriate specific thresholds may be defined and applied in the logical operations in order to diagnose the winding sets.

Thereby, the method is flexible and allows the user to select the appropriate power component, i.e. the active power component and/or reactive power component depending on the particular application.

According to an embodiment of the present invention, at least one or all of the difference threshold, the first threshold and the second threshold is fixed or load or power dependent.

Even though ratios are compared to the respective threshold, the thresholds may nevertheless still be load dependent, in particular power dependent. In other embodiments, the respective thresholds may be set as fixed values.

According to an embodiment of the present invention, in total N winding sets are included in the stator, wherein diagnosing the N winding sets includes: obtaining power difference ratios being proportional to a ratio between a respective second harmonic power difference of two of the N windings sets and a sum of the respective power time averages of the two of the N windings sets; obtaining N power ratios being proportional to a ratio between the strength of a second harmonic of a power produced from one of the N winding sets and a power time average of the one of the N winding sets; comparing the power difference ratios to respective thresholds, in particular exactly one difference threshold; comparing the power ratios with respective thresholds, in particular exactly one threshold; wherein N is in particular between 2 and 10; and diagnosing the winding sets based on the comparisons.

Thereby, the diagnostic method may be applied to a multi-stator generator having N winding sets, wherein N is 2, 3, 4, 5, 6, 7, 9, 10 or even larger than 10. Thereby, the method is applicable to a wide range of different types of multi-winding stators.

According to an embodiment of the present invention, obtaining the first strength and/or the second strength and/or the first power time average and/or the second power time average comprises: measuring first currents, in particular three phase currents, of the first winding set; and/or measuring second currents, in particular three phase currents, of the second winding set; and/or obtaining first voltages, in particular three phase voltages, of the first winding set; and/or obtaining second voltages, in particular three phase voltages, of the second winding set; and/or calculating the first power from the first currents and the first voltages; and/or calculating the second power from the second currents and the second voltages.

Measuring the first current may involve to measure the currents at all output terminals of the respective winding sets, for example three output terminals. The voltages may either be measured or may be obtained as reference voltages as supplied to a converter which may be coupled to the generator. The first power and the second power may be calculated in the rotating frame and/or in the stationary d, q-frame which rotate synchronously having the fundamental electric frequency. Thereby, the skilled person is enabled to carry out the invention.

According to an embodiment of the present invention, the method further comprises applying an adaptive bandpass filter passing the second harmonic to the first power, to obtain the first strength; and/or applying an adaptive bandpass filter passing the second harmonic to the second power, to obtain the second strength.

The adaptive bandpass filter may have a pass window which lets pass through the second harmonic. Since the rotational speed of the rotor may change during operation, it is necessary to apply an adaptive bandpass filter having an adaptive bandpass which changes according to the rotational speed of the rotor. Alternatively or additionally, the first strength or the second strength may be obtained by applying a frequency analysis, such as by Fourier transformation, of the respective power. Thereby, the first strength and second strength may easily be calculated from measured quantities or reference quantities.

According to an embodiment of the present invention, the method further comprises calculating the first power time average as time average of the first power over a moving window having window size of $1/2f$, wherein f is the fundamental electrical frequency; calculating the second power time average as time average of the second power over a moving window having a window size of $1/2f$, wherein f is the fundamental electrical frequency.

The window size may be different from $1/2f$ in other embodiments. The first power time average may also be referred to as the DC value of the first power and the second power time average may also be referred to as the DC value of the second power. Thereby, a simple manner to derive the first and the second power time averages is provided. A low-pass filer may also be used for obtaining the dc value of the power.

It should be understood that features, individually or in any combination, disclosed, described or explained in the context of a method of monitoring a first winding set and at least one second winding set of a stator of a generator during operation may also apply, individually or in any combination, to an arrangement for monitoring multiple winding sets of a generator according to embodiments of the present invention and vice versa.

According to an embodiment of the present invention it is provided an arrangement for monitoring a first winding set and at least one second winding set of a stator of a generator during operation, the arrangement comprising: a processor configured: to obtain a first strength of a second harmonic of a first power produced from the first winding set; to obtain a second strength of a second harmonic of a second power produced from the second winding set; to diagnose the first winding set and/or the second winding set based on a second harmonic power difference between the first strength and the second strength.

The arrangement may comprise in particular an input port for obtaining measurement signals, such as current measurement signals and/or voltage measurement signals or voltage reference signals. The arrangement may then be adapted for calculating the first power and the second power produced by the first and the second winding sets, respectively. The arrangement may be adapted to apply a transformation to transform the quantities into a d-q-frame rotating synchronously with the fundamental frequency. The arrangement may further comprise an adaptive filter and may be configured for calculating a moving time average. Furthermore, the arrangement may comprise logical/arithmetic circuitry. The arrangement may be adapted to carry out a method of monitoring winding sets as explained in embodiments above.

According to an embodiment of the present invention it is provided a generator, comprising: a stator having a first winding set and at least one second winding set; a rotor rotatably supported relative to the stator; and an arrangement according to the preceding embodiment.

Furthermore, a wind turbine is provided comprising a generator according to the previously described embodiments and rotor blades connected to a rotor shaft that is coupled with the generator.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein:

FIG. 1 schematically illustrates a wind turbine according to an embodiment of the present invention comprising a generator according to an embodiment of the present invention;

FIG. 4 schematically illustrates a method of monitoring winding sets of a generator according to an embodiment of the present invention.

DETAILED DESCRIPTION

Figure 1:
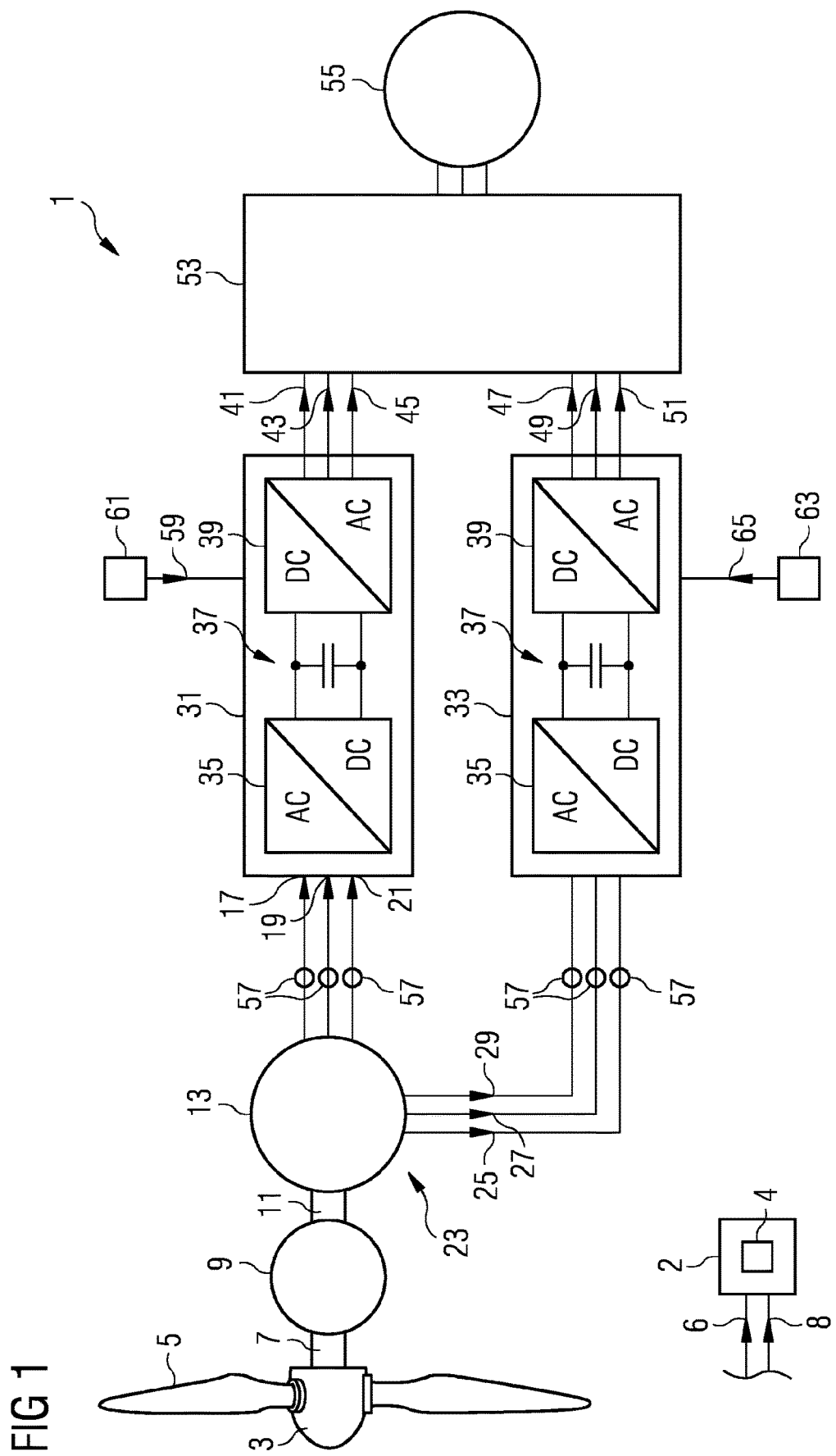

The illustration in the drawings is in schematic form. It is noted that in different figures, similar or identical elements are provided with the same reference signs or with reference signs, which are different from the corresponding reference signs only within the first digit.

The wind turbine 1 schematically illustrated in FIG. 1 comprises a hub 3 at which plural rotor blades 5 are connected. The hub 3 is connected to a rotation shaft 7 which is coupled to a gearbox 9 which is optional. A secondary shaft 11 also coupled to another end of the gearbox 9 is coupled to a generator 13 having a two winding set stator. At a first winding set 15, in particular three winding set, the generator 13 outputs first power as three phase currents 17, 19, 21. A second winding set 23 outputs second power 25, 27, 29 as three-phase currents. The first power 17, 19, 21 produced by the first winding set 15 is supplied to a first AC-DC-AC converter 31 and the second power 25, 27, 29 is supplied to a second AC-DC-AC converter 33. Thereby, the first converter 31 as well as the second converter 33 comprises an AC-DC converter portion 35, a DC link 37 and a DC-AC converter portion 39. The converters 31, 33 are configured for converting a variable frequency AC power stream 17, 19, 21 or 25, 27, 29, to a fixed frequency power stream, in particular three-phase power streams 41, 43, 45 or 47, 49, 51, respectively. The two power streams from the first winding set 15 and the second winding set 23 are transformed in a common transformer 53 to higher voltage to be provided as a three-phase power stream to a utility grid 55.

The wind turbine 1 further comprises an arrangement 2 according to an embodiment of the present invention for monitoring the first winding set 15 and the second winding set 23 of the generator 13 during operation. Thereby, the arrangement 2 carries out a method of monitoring the first winding set 15 and the second winding set 23 according to an embodiment of the present invention. Therefore, the arrangement 2 comprises a processor 4 which is configured to obtain a first strength of a second harmonic of a first power produced from the first winding set 15, wherein the first power is supplied to the arrangement 2 using a first power signal 6 which may be obtained by measuring currents in the first winding set 15 using current sensors 57. The processor 4 is further configured to obtain a second strength of a second harmonic of a second power produced from the second winding set 23, wherein the processor receives a second power signal 8 indicative of the second power 25, 27, 29 output by the second winding set 23. The processor is further configured to diagnose the first winding set 15 and/or the second winding set 23 based on a second harmonic power difference between the first strength and the second strength.

In a control system of a permanent magnet synchronous generator, such as generator 13 illustrated in FIG. 1, measured phase current and reference voltage are readily available and are used in embodiments of the present invention for diagnostic purposes. Herein, the currents output by the first winding set 15 are measured using the current sensors 57 and the first reference voltage 59 as supplied by a controller 61 to the first converter 31 are used to derive the first power, supplied as first power signal 6 to the arrangement 2. In an analogous manner, currents and voltages of the second power stream or power flux 25, 27, 29 as produced by the second winding set 23 are obtained and the respective second power is supplied as a second power signal 8 to the arrangement 2. For a given stator and a multi-stator generator, active and reactive instantaneous power may be given in the stationary and the synchronous reference frames as follows:

$$p = u_\alpha i_\alpha + u_\beta i_\beta$$

$$q = u_\beta i_\alpha - u_\alpha i_\beta \tag{1}$$

$$p = 3/2(u_d i_d + u_q i_q)$$

$$q = 3/2(u_q i_d - u_d i_q) \tag{2}$$

wherein $u_{dq}$ and $i_{dq}$ stand for voltages and currents in the synchronous reference frame and $u_{\alpha\beta}$ and $i_{\alpha\beta}$ stand for voltages and currents in the stationary reference frame, i.e. the d-q-reference frame would rotating synchronously with the fundamental electrical frequency. Having calculated the active and reactive power (i.e. the first active and reactive power p1, q1 and the second active and reactive power p2 and q2), their DC value may be obtained by means of a moving average with a moving size of 1/(2*f), while the 2f amplitude obtained by using an adaptive bandpass filter as below:

$$BPF(z) = 1 - \frac{4\pi f \xi s}{s^2 + 4\pi f \xi s + (2\pi f)^2}\bigg|_{s=\frac{2}{T_s}\frac{z-1}{z+1}} \tag{3}$$

Calculating the amplitude sinusoidal signal with a frequency of 2f may be given by the average absolute values multiplied by π/2.

Both calculations, i.e. to obtain the dc value of power and/or to obtain amplitudes of 2f harmonic can be done in alternative ways, as was mentioned above.

An implementation of the filter may be:

$$= \frac{a_2 z^2 + a_1 z + a_0}{z^2 + b_1 z + b_0} = \frac{a_2 + a_1 z^{-1} + a_0 z}{1 + b_1 z^{-1} + b_0 z}$$

$$a_2 = -a_0 = \frac{8\pi f \xi}{\frac{4}{T_s} + 8\pi f \xi + 4 T_s \pi^2 f^2}$$

$$a_1 = 0$$

$$b_1 = \frac{-\frac{8}{T_s} + 8\pi^2 f^2 T_s}{\frac{4}{T_s} + 8\pi f \xi + 4 T_s \pi^2 f^2}$$

$$b_0 = \frac{\frac{4}{T_s} - 8\pi f \xi + 4\pi^2 f^2 T_s}{\frac{4}{T_s} + 8\pi f \xi + 4 T_s \pi^2 f^2}$$

Thus, speed information is required for extracting DC and harmonic level which is given by a speed estimator available in the control system 61, 63 or in further control equipment. The second controller 63 supplies a second reference voltage signal 65 to the second converter 33.

For the sake of simplicity, a dual stator machine (as is for example illustrated in FIG. 1) is taken as an example for which the following diagnostic signal is calculated:

$$d_{12} = \frac{X_{2,2f} - X_{1,2f}}{|X_{1,DC} + X_{2,DC}|} \times 2 \times 100\% \tag{4}$$

where $X_1$ and $X_2$ stand for the active power (P) or reactive power (Q) of the first winding set 15 and the second winding set 23, respectively. $X_{DC}$ stands for the amplitude of the DC component of the power of the respective power and $X_{2f}$ stands for the amplitude of the second harmonic. $d_{12}$ can be either positive or negative.

The above equation allows to detect faults (high resistance connections) in a single stator of a dual stator generator, but identical faults in the two stators may pass undetected. Therefore, additional information may be needed to detect simultaneous fault occurrences in both winding sets 15, 23, which may be given by the equations below:

$$d_1 = \frac{X_{1,2f}}{|X_{1,DC}|} \times 100\% \tag{5}$$

$$d_2 = \frac{X_{2,2f}}{|X_{2,DC}|} \times 100\% \tag{6}$$

where $d_1$ and $d_2$ are always positive values.

It is worth noting that the fault detection based on (5) and (6) is expected to be slower and less sensitive in comparison to the use of equation (4), since a higher fault threshold must be set in order to ensure robustness against transients and to cope with load dependence.

In summary, for a complete fault diagnosis of a dual stator machine, three diagnostic signals and two thresholds may be required. The fault diagnosis complexity naturally increases together with the number of stators or winding sets, for a machine with N three-phase stators, the number of needed signals is given by $N+(N^2-N)/2$, i.e. $(N^2-N)/2$ signals as in (4) and N signals as in (5). Taking a four stator generator as a second example, ten diagnostic signals will be employed ($D_{12}$, $D_{13}$, $D_{14}$, $D_{23}$, $D_{24}$, $D_{34}$, $D_1$, $D_2$, $D_3$, $D_4$). Concerning the number of fault thresholds, it is equal to 2 and independent of the number of winding sets.

Figure 2:
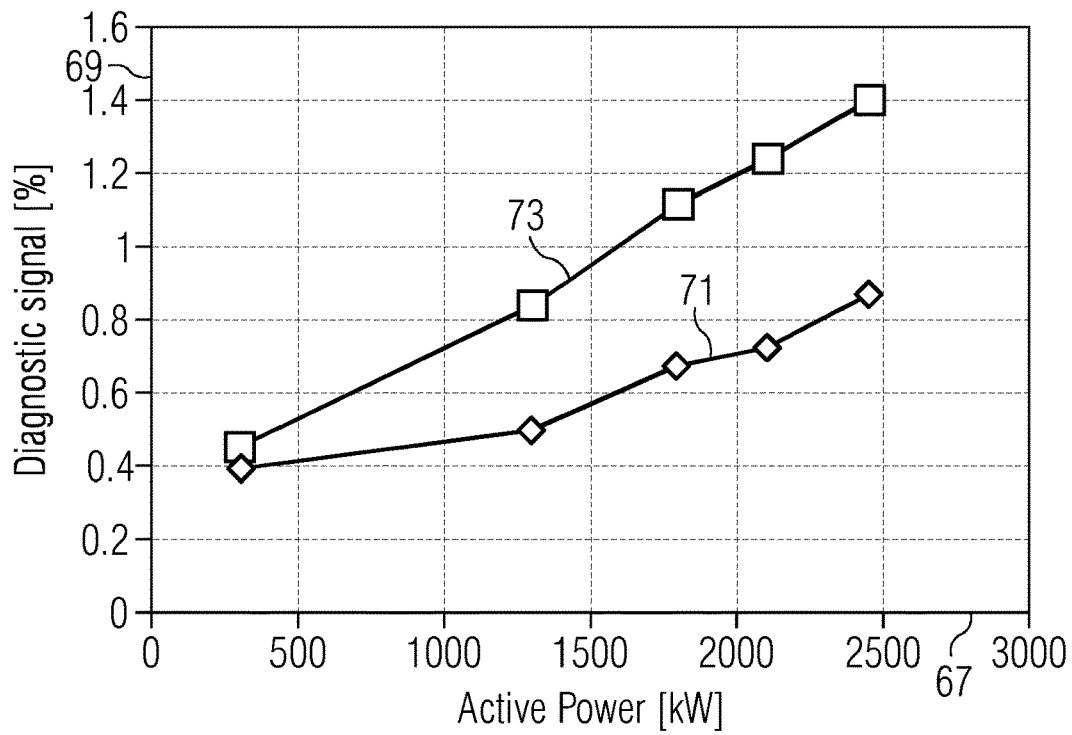
FIG. 2 illustrates a graph with diagnostic signals as considered in an embodiment of the present invention.

In order to achieve an effective fault diagnosis, it is vital to consider inherent asymmetries of a healthy machine and their impact on the fault signatures. Experimental data from a healthy dual stator permanent magnet generator (such as illustrated in FIG. 1) is shown in FIG. 2 for illustration purposes. Thereby, the abscissa 67 indicates the active power and the ordinate 69 indicates the diagnostic signal. Thereby, the curve 73 illustrates the quantity $d_{12}$ (equation (4)) when the active power is connected, while the curve 73 indicates the quantity $d_2$ as obtained by equation (6). From FIG. 2 it becomes obvious that the newly proposed diagnostic signal $D_{12}$ (curve 71) is less load dependent than the signal $D_2$ (curve 73).

Figure 3:
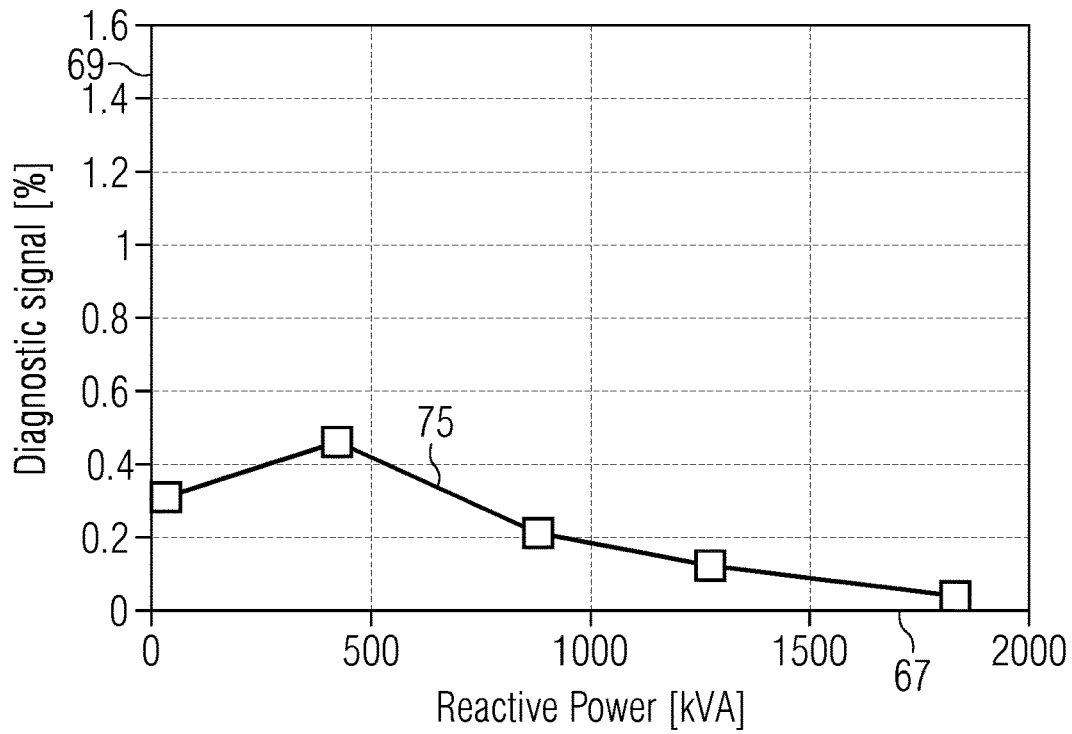
FIG. 3 illustrates a graph showing a diagnostic signal considered in an embodiment of the present invention.

While in FIG. 2, the instantaneous active power is used to derive the diagnostic signal, in FIG. 3 having same abscissas, the use of the reactive power is shown instead as a curve 75. It can be concluded from FIGS. 2 and 3 that the range of the variation of the signal $d_{12}$ in FIG. 2 (active power) and FIG. 3 (reactive power) is identical or similar and both may be suitable for diagnosis. Preliminary results with high resistance connections show that both active and reactive powers may be valid options.

Finally, the setting of the fault threshold ($T_{12}$, $T_1$) needs to be carefully considered in order to endow the diagnostic method with robustness and sensitivity. For the sake of simplicity of implementation, the use of fixed thresholds may be chosen according to an embodiment of the present invention. Other embodiments apply load or power dependent thresholds.

For a dual stator generator, the fault detection logic may be as indicated below:

If abs(d12−Doffset)>T12, fault detected in one winding set.

If d1>T1 and d2>T1 and abs(d12−Doffset)<T12, fault detected both winding sets, wherein Doffset=(d12,min+d12,max)/2, wherein d12,min and d12,max are minimum and maximum values assumed by d12 under healthy condition. $T_{12}$ must be higher than the highest values assumed by abs(d12−Doffset) under healthy operation and $T_1$ must be higher than the highest value assumed by $d_1$ and $d_2$ under healthy operation.

The quantity d12−Doffset is also referred to as a term derived from the power difference ratio (e.g. d12) diminished by a difference threshold (e.g. T12). The sign of this term may identify the faulty winding set. As an example, if the term is positive at the time of fault detection, the second winding set is the faulty one. On the other hand, if the term is negative, the first winding set is the faulty set.

Alternatively, load dependent thresholds may be employed, such solution increases the implementation complexity and may require a very accurate knowledge of the fault signature under normal operation which is not desirable due to manufacturing tolerances. However, it may be required by critical applications such as offshore turbines, where sensitive condition monitoring is very important.

FIG. 4 illustrates a flow-chart of a method of diagnosing multiple winding sets according to an embodiment of the present invention. In the first step 77 of the method 76, measured currents, reference voltages and estimated speed of N stators/converters are acquired. In the next method step 79, the instantaneous powers (active power P and reactive power Q) are calculated for the N stators/converters. In the next method step 81, the DC value and the second harmonic value of the reactive power and/or active power for the N stators/converters are calculated, in particular using an adaptive filter. In the next method step 83, the diagnostic signals, such as signals of equation (4), (5), (6) are calculated for each of the N stators/converters. In the decision block 85, a fault detection logic is applied, such as the one described above, to detect a fault or not. If no fault is detected, the method branches again to the first method step 77. If a fault is detected, the method step 87 is carried out, wherein either the operation is stopped or another remedy measure is taken.

Embodiments of the present invention provide a solution for online condition monitoring and protection of generators employed in wind turbines. A diagnostic method to detect unbalanced operation of multi-stator permanent magnet generators is provided. A diagnostic method to detect high resistance connections in multi-stator permanent magnet generator is proposed. A diagnostic method suitable for implementation in the controller of a frequency converter is proposed.

Thus, the arrangement 2 of FIG. 1 may be a part of one of the controllers 61, 63 such that the controllers may, upon detection of a fault in one or two of the windings 15, 23 shut down at least the affected winding or take other measures for avoiding damage of the generator and/or converter or other components of the wind turbine.

The generator 13 illustrated in FIG. 1 comprises a multi-stator with isolated neutral points.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of monitoring a first winding set and at least one second winding set of a stator of a generator during operation, the method comprising:

obtaining a first strength of a second harmonic of a first power produced from the first winding set;

obtaining a second strength of a second harmonic of a second power produced from the at least one second winding set; and diagnosing the first winding set and/or the at least one second winding set based on a harmonic power difference between the first strength and the second strength.

2. The method according to claim 1, further comprising:

obtaining a first power time average of the first power;

obtaining a second power time average of the second power;

wherein the diagnosing involves forming a power difference ratio proportional to a ratio between the harmonic power difference and a sum of the first power time average and the second power time average.

3. The method according to claim 2, wherein diagnosing involves comparing a term derived from the power difference ratio diminished by a difference threshold, wherein one of the first or the second winding set is diagnosed as faulty, if the absolute of the term is larger than the difference threshold.

4. The method according to claim 3, wherein the term is formed as the power difference ratio diminished by an offset being related to an expected difference of power output between the first winding set and the second winding set, both in a normal state.

5. The method according to claim 1, wherein the second harmonic relates to two times a fundamental electrical frequency that is proportional to a rotational speed of a rotor rotating relative to the stator.

6. The method according to claim 2, further comprising:
forming a first power ratio being proportional to a ratio between the first strength and the first power time average;
comparing the first power ratio with a first threshold;
forming a second power ratio being proportional to a ratio between the second strength and the second power time average;
comparing the second power ratio with a second threshold;
diagnosing the first winding set and the second winding set as faulty, if:
the first power ratio is larger than the first threshold and the second power ratio is larger than the second threshold and
the absolute of the term is smaller than the difference threshold.

7. The method according to claim 2, wherein the first power and/or the second power includes active power and/or reactive power, wherein for active power and/or reactive power respective strengths of the second harmonic of the power and/or respective second harmonic power differences and/or respective power time averages and/or respective power difference ratios are obtained and used, individually or in combination, for the diagnosing.

8. The method according to claim 6, wherein at least one or all of the difference threshold, the first threshold and the second threshold is fixed or load dependent.

9. The method according to claim 1, wherein in total N winding sets are included in the stator, wherein diagnosing the N winding sets includes:
obtaining $(N^2-N)/2$ power difference ratios being proportional to a ratio between a respective harmonic power difference of two of the N windings sets and a sum of the respective power time averages of the two of the N windings sets;
obtaining N power ratios being proportional to a ratio between the strength of a second harmonic of a power produced from one of the N winding sets and a power time average of the one of the N winding sets;
comparing the power difference ratios to respective thresholds, in particular exactly one difference threshold;
comparing the power ratios with respective thresholds;
wherein N is between 2 and 10; and
diagnosing the winding sets based on the comparisons.

10. The method according to claim 2, wherein the obtaining the first strength and/or the second strength and/or the first power time average and/or the second power time average comprises:
measuring first currents of the first winding set; and/or
measuring second currents of the second winding set; and/or
obtaining first voltages of the first winding set; and/or
obtaining second voltages of the second winding set; and/or
calculating the first power from the first currents and the first voltages; and/or
calculating the second power from the second currents and the second voltages.

11. The method according to claim 1, further comprising:
applying an adaptive band pass filter passing the second harmonic to the first power, to obtain the first strength; and/or
applying an adaptive band pass filter passing the second harmonic to the second power, to obtain the second strength.

12. The method according to claim 2, further comprising:
calculating the first power time average as a time average of the first power over a moving window having window size of 1/2f, wherein f is the fundamental electrical frequency;
calculating the second power time average as a time average of the second power over a moving window having a window size of 1/2f, wherein f is the fundamental electrical frequency.

13. An arrangement for monitoring a first winding set and at least one second winding set of a stator of a generator during operation, the arrangement comprising:
a processor configured:
to obtain a first strength of a second harmonic of a first power produced from the first winding set;
to obtain a second strength of a second harmonic of a second power produced from the second winding set;
to diagnose the first winding set and/or the second winding set based on a harmonic power difference between the first strength and the second strength.

14. A generator, comprising:
a stator having a first winding set and at least one second winding set;
a rotor rotatably supported relative to the stator; and
an arrangement according to claim 13.

15. A wind turbine, comprising:
a generator according to claim 13; and
rotor blades connected to a rotor shaft that is coupled with the generator.

* * * * *